May 2, 1939.　　　　F. HINRICHS　　　　2,156,498

VALVE

Filed Nov. 26, 1937　　　2 Sheets-Sheet 1

INVENTOR.
Ferdinand Hinrichs
BY
Morsell Lieber & Morsell
ATTORNEYS.

INVENTOR.
Ferdinand Hinrichs
BY
ATTORNEYS.

Patented May 2, 1939

2,156,498

UNITED STATES PATENT OFFICE 2,156,498

VALVE

Ferdinand Hinrichs, Kenosha, Wis.

Application November 26, 1937, Serial No. 176,512

9 Claims. (Cl. 137—21)

This invention relates to improvements in valves and more particularly to valves of the leak detector type.

In certain types of tanks or receptacles, particularly tanks used in connection with pasteurizing equipment for milk or the like, it is essential that all portions of the milk or other liquid be permitted to circulate freely in the pasteurizer so that complete pasteurization of the entire contents is effected. If a portion of the milk is trapped or kept separate from the main body of liquid, this portion will not be properly pasteurized and may become rancid and contaminate the entire contents. This condition is likely to occur adjacent valve fittings because the valves now in common use do not close sufficiently near to the inner wall of a double walled insulated tank. As a result pockets of an objectionable nature are formed in the wall of the tank. In addition, all valves, and particularly those used in connection with milk receptacles will leak sooner or later, and the problem is therefore present of preventing unpasteurized milk which has leaked past the valve from contaminating the rest of the liquid when the valve is opened to discharge the latter.

Heretofore valves have been proposed which were constructed to by-pass leakage fluid to a separate discharge point. These valves have, however, been of the cock type having a rotatable and tapered valve body with a port extending therethrough. This type of valve is objectionable for pasteurizer and analogous uses for the following reasons:

1. The tapered valve body frequently sticks in use.

2. The valve cannot be made to close off sufficiently near to the inner wall of a double walled insulated receptacle, and as a result objectionable pockets are formed.

3. A slug of liquid is likely to be trapped in the port of the valve body when the latter is turned to shut-off position.

4. The cock type of valve is not a suitable type to manufacture from stainless steel because objectionable galling will take place.

5. The cock type of valve cannot be readily surrounded by a steam jacket for the purpose of insuring complete pasteurization.

6. The cock type of valve is relatively difficult to clean and to regrind.

It is a general object of the present invention to provide a valve of the poppet type which is so constructed as to effectively by-pass any leakage fluid to a point of discharge and thereby avoid possible contamination.

A further object of the invention is to provide a valve which may be used for either inlet or discharge purposes.

A further object of the invention is to provide a valve of the class described which may be so attached to a double walled insulated container as to close off relatively close to the inner wall and thereby avoid the formation of objectionable pockets.

A further object of the invention is to provide a combination with a double walled insulated tank of a poppet type valve secured in an opening in the tank wall in such a way as to close off close to the inner wall of the tank.

Other objects of the invention are to provide a valve of the class described which will not stick in use; which may be readily manufactured from stainless steel without danger of galling action taking place during use; which has its discharge chamber so located that the valve may be readily surrounded by a steam jacket; which is simple to clean and regrind; which is relatively simple in construction; and which is well adapted for the purpose described and for other purposes wherein similar problems are encountered.

With the above and other objects in view, the invention consists of the improved valve and all its parts and combinations as set forth in the claims and all equivalents thereof.

In the accompanying drawings illustrating several preferred embodiments of the invention, in which the same reference numerals designate the same parts in all of the views.

Figure 1:
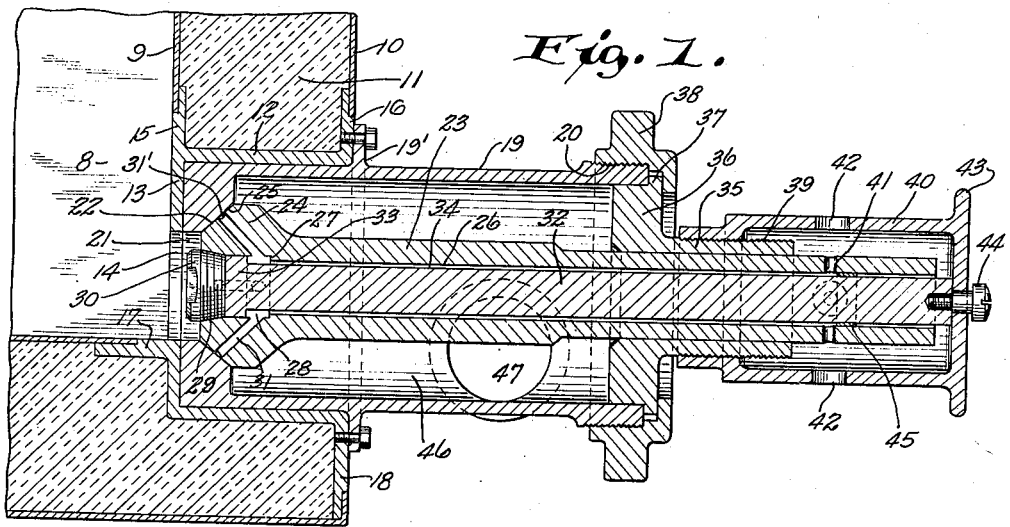
Fig. 1 is a longitudinal sectional view through the valve showing it in connection with a fragment of a tank.
Figure 2:
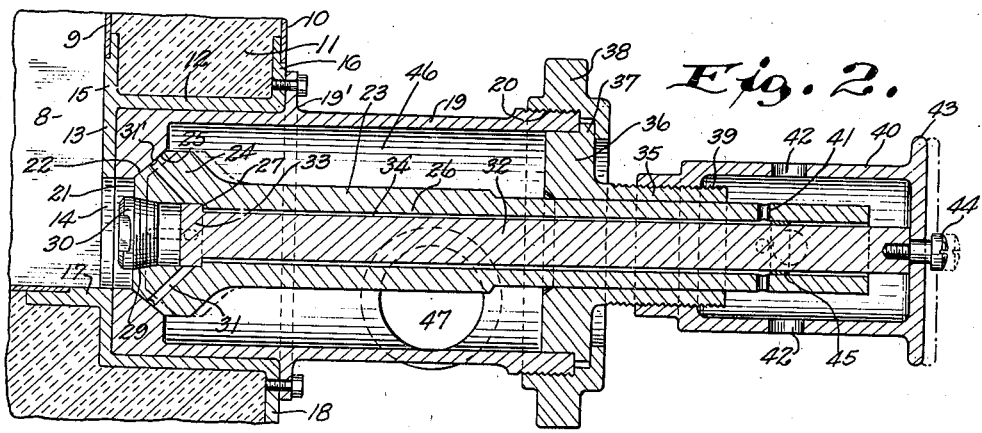
Fig. 2 is a similar view showing the by-pass ports closed just prior to opening of the valve for discharge purposes, the dot-and-dash lines indicating a partially open position of the valve proper.

Referring more particularly to Figs. 1 and 2, the numeral 8 designates a tank of the type used in connection with pasteurizing equipment having an inner wall 9, an outer wall 10, and insulation 11 between said inner and outer walls. The side wall of the tank may have an opening therein, preferably adjacent the bottom of the tank, as illustrated, for the reception of a cup-shaped fitting 12, the inner wall 13 of said fitting being in substantial alinement with the inner wall of the tank and having an opening 14 therein. The fitting 12 may be provided with extensions 15, 16, 17 and 18 for cooperation with the inner and outer walls of the tank.

The valve may comprise an outer cylinder 19 having one end externally threaded as at 20 and having its other end partially closed and formed with an opening 21 for registration with the opening 14 in the wall 13 of the fitting 12. Around the opening 21 of the cylinder 19, the end of the cylinder is formed of relatively thick material which is tapered as at 22 to form a valve seat. This taper may be at any desired angle, but it is desirable to use a taper of from 45 to 60 degrees to thereby attain more bearing surface for the valve.

Positioned axially in the cylinder 19 is a sleeve 23 forming a stem for the valve 24. The valve 24 has an annular tapered face 25 for cooperation with the tapered face 22 of the valve seat. The bore 26 of the valve stem is enlarged within the valve member 24 to form an annular shoulder 27 and a chamber 28. The chamber 28 in turn is flared and threaded at the inner end of the valve as at 29 to receive a threaded plug 30.

A plurality of ports 31 extend from an annular groove 31' in the tapered valve face 25 to the chamber 28.

Slidable loosely within the sleeve 23 is an actuating stem 32 having an enlarged head 33 which is movable in the chamber 28 from the position of Fig. 1 to the position of Fig. 2 wherein said head 33 seats against the shoulder 27 to close the ends of the ports 31. This head 33 therefore forms a valve for the by-pass ports. There is substantial clearance as at 34 around the stem 32 so that an annular passage way is formed through which fluid may travel from the ports 31 and chamber 28 when the by-pass valve 33 is in the position of Fig. 1.

The outer end of the sleeve 23 is slidable in a bearing 35, which bearing forms an extension from the end closure 36 for the cylinder 19, and the end closure 36 has an annular shoulder 37 which is forced against the end of the cylinder 19 when a union nut 38 is threaded into position.

The bearing extension 35 is externally threaded as at 39 to receive the threaded inner end portion of a cylindrical operating member 40. The portion of the sleeve 23 within the operating member 40 has a plurality of ports 41 to permit the escape of fluid from the annular passage 34, and said fluid can in turn escape from the apertures 42 of the operating member. The outer end of the operating member may be enlarged as at 43 to provide a hand wheel, and said end is secured by a screw 44 to the outer end of the actuating stem 32. In order to keep the actuating stem properly centered, a centering ring 45 may be employed between the ports 41 and the outer end of the stem 32.

The valve casing 19 may be provided with any suitable attachment means for readily connecting the same to the tank. It is preferred to employ the flanges 19' which are connected by bolts to the extensions 15 and 18 of the fitting 12, the flanges 19' being so positioned as to cause the inner end of the valve casing to abut the inner wall 13 of the fitting 12.

In use the valve 24 is normally in the closed position of Fig. 1, and the by-pass valve 33 is in the position shown in said figure. If any milk being pasteurized within the tank 8 tends to leak between the cooperating tapered faces 22 and 25 of the valve and valve seat, it will ultimately enter the annular groove 31' and be conducted by the ports 31 into the chamber 28. From the chamber 28 the leakage fluid may pass through the annular passage way 34 around the stem 32 to ultimately drip out of the openings 41 and 42. Thus any leakage fluid is kept entirely separated from the main valve chamber. When it is desired to discharge liquid from the tank 8, the hand wheel 43 is rotated to cause an outward pull on the actuating stem 32. This causes the by-pass valve 33 to be moved from the position of Fig. 1 to the position of Fig. 2 to close off the by-pass ports 31. Further outward movement of the actuating stem 32 will cause opening of the main valve 24 as indicated by the dot-and-dash lines in Fig. 2. Thus the liquid within the receptacle may pass into the discharge chamber 46 and out through the outlet 47.

Figure 3:
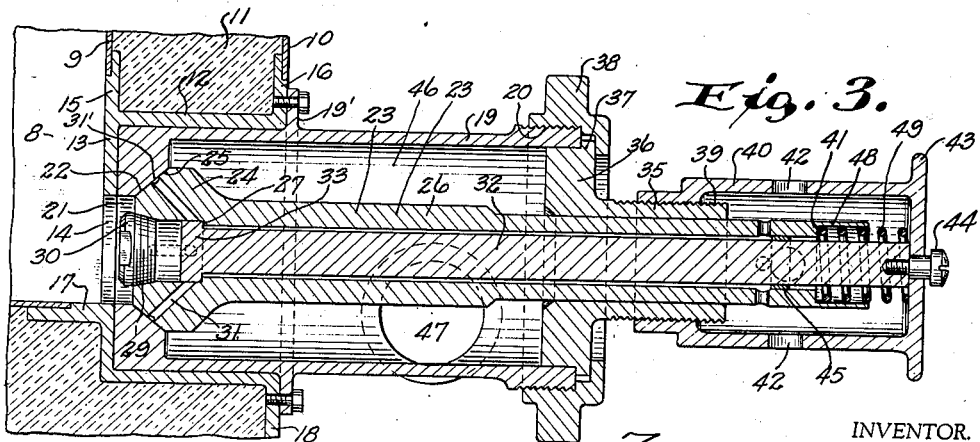
Fig. 3 is a view similar to Fig. 2, illustrating a modified form of the invention.

In the form of invention shown in Fig. 3, all parts are constructed and function identically to corresponding parts of the principal form of the invention, and the same reference numerals are indicated thereon. In this form of the invention, however, yielding means is employed for the purpose of positively maintaining the main valve 24 in closed position until after the by-pass valve 33 has been moved to the position of Fig. 3. As one way of accomplishing this purpose the outer end of the sleeve 23 may be of enlarged internal diameter as at 48 to receive a coil spring 49. This spring acts between the end wall of the operating member 40 and the shoulder 41 to normally urge the valve 24 into closing position. After the by-pass valve 33 has been moved to a position to close off the by-pass ports, as in Fig. 3, the further movement of the hand wheel 43 will cause opening of the main valve 24 against the tension of the spring 49.

Figure 4:
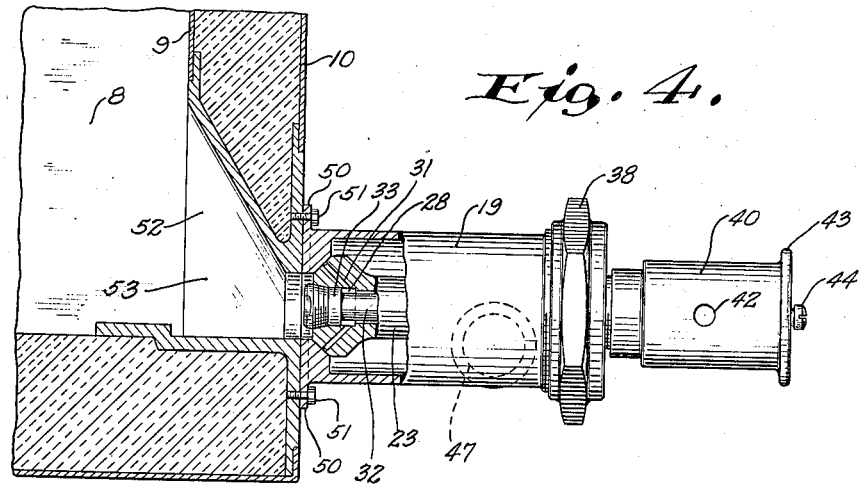
Fig. 4 is a side elevational view showing a valve attached to the outside wall of a tank, the tank being of the type having a tapered pocket in the wall thereof, parts of the valve and tank being broken away and shown in section.

In the form of invention shown in Fig. 4, the construction is the same as in the principal form of the invention except that the outer cylinder 19 has its attachment flanges 50 on the extreme inner end to connect by bolts 51 with the outer wall of the tank 8. This method of attachment may be employed where the wall of the tank is provided with a flared opening extending from the inner wall 9 to the outer wall 10, which opening has a long tapered wall portion 52. The method of attachment shown in Figs. 1, 2 and 3 is preferred to that shown in Fig. 4, because even with the long tapered wall portion 52, nevertheless a certain amount of milk may be trapped in the pocket 53 and kept from circulating freely with the main contents of the tank.

Figure 5:
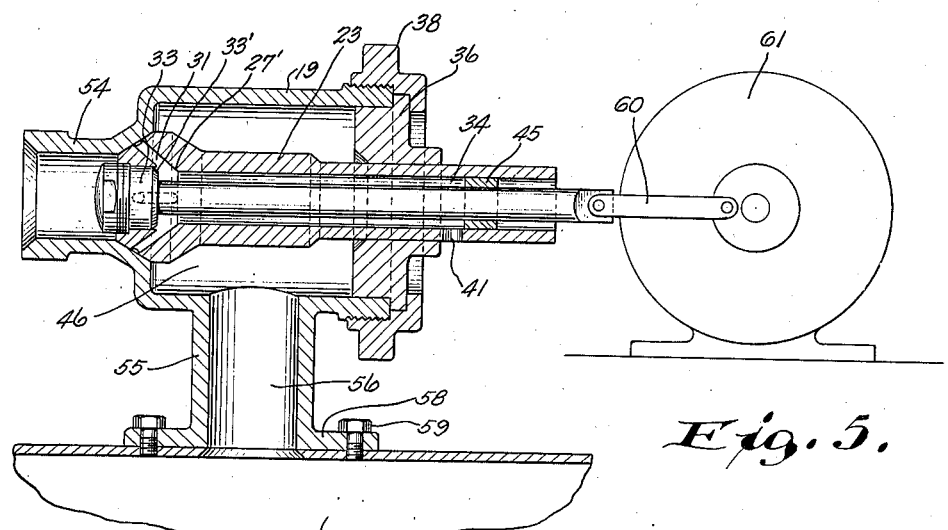
Fig. 5 is a vertical sectional view of a modification showing the valve arranged to control an inlet opening into a tank.
Figure 6:
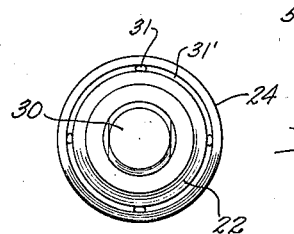
Fig. 6 is an end view of the valve member proper, illustrating the annular groove and by-pass ports connecting therewith.

Fig. 5 illustrates the valve as it is designed for inlet purposes, and in this form of the invention the outer casing 19 is formed with an inlet extension 54 for connection with a suitable means for supplying liquid. The lower portion of the casing 19 has a tubular extension 55 depending therefrom, forming a passage way 56 for conveying the liquid into the tank 57. The tubular extension 55 may be provided with an annular flange

58 to facilitate connection to the tank by means of bolts 59. In Fig. 5 the actuating stem 32 is shown as connected by a flexible link 60 with suitable automatic actuating mechanism 61. It is obvious, however, that the hand wheel shown in the principal form of the invention may be substituted for the automatic actuating mechanism 61. In either this form of the invention or in the principal form, the by-pass valve 33 may have an annular taper 33' on its inner end for seating against a tapered portion 27' in lieu of the straight shoulder 27 shown in the principal form of the invention.

From the above it is apparent that in all forms of the invention a poppet type valve has been provided which will effectively by-pass leakage liquid to a separate discharge point so that said leakage fluid will not contaminate the remainder of the liquid when the valve is open to discharge the latter. It is also apparent that a valve has been provided which will not stick in use, which may be readily manufactured from stainless steel without danger of galling action taking place during use, which has its discharge chamber so located that the valve may be readily surrounded by a steam jacket, and which is simple to clean and regrind. It is further apparent that in the forms of the invention shown in Figs. 1, 2 and 3, that the valve is adapted for cooperation with a tank in such a way as to close off relatively near to the inner wall of a double walled insulated tank and thereby avoid the formation of objectionable pockets.

Although only a few forms of the invention have been shown and described, it is obvious that various changes and modifications may be made without departing from the spirit of the invention, and all of such changes are contemplated as may come within the scope of the claims.

I claim:

1. A valve comprising an outer casing having an inlet opening, having a discharge chamber, and having a discharge opening, a single reciprocably movable valve for shutting off communication between said inlet opening and discharge chamber, said valve having a reciprocably movable valve stem, means for by-passing liquid which leaks past a portion of said single valve when the latter is closed to prevent the leakage from entering the discharge chamber, and means for closing said by-pass prior to opening of said single valve.

2. A valve comprising an outer casing having an inlet opening, having a discharge chamber, and having a discharge opening, a valve seat surrounding said inlet opening, a reciprocably movable valve having a face engageable with said valve seat for shutting off communication between the inlet opening and discharge chamber, said valve face having a groove therein, a reciprocably movable stem for said valve having a leak passage way therein communicating with the exterior, and ports leading from said groove in the valve face to said leak passage way for by-passing leakage liquid to said passage way and to the exterior and thereby prevent the same from entering the main discharge chamber of the valve.

3. A valve comprising an outer casing having an inlet opening, having a discharge chamber, and having a discharge opening, a valve seat surrounding said inlet opening, a reciprocably movable valve having a face engageable with said valve seat for shutting off communication between the inlet opening and discharge opening, said valve face having a groove therein, a reciprocably movable stem of sleeve form for said valve, an actuating stem slidable loosely within said sleeve to provide a leak passage way between the stem and sleeve, said valve having ports leading from the groove to the leak passage way for by-passing leakage liquid to said leak passage way, and means movable in response to movement of said actuating stem for closing said by-pass, said actuating stem being further movable to open the valve.

4. A valve comprising an outer casing having an inlet opening, having a discharge chamber, and having a discharge opening, a valve seat surrounding said inlet opening, a reciprocably movable valve having a face engageable with said valve seat for shutting off communication between the inlet opening and discharge opening, said valve face having a groove therein, a reciprocably movable stem of sleeve form for said valve, an actuating stem slidable loosely within said sleeve to provide a leak passage way between the stem and sleeve, said valve having ports leading from the groove to the leak passage way for bypassing leakage liquid to said leak passage way, and a by-pass valve at the inner end of the actuating stem movable in response to movement of the latter to first close said by-pass and then urge the main valve to open position.

5. A valve comprising an outer casing having an inlet opening, having a discharge chamber, and having a discharge opening, a tapered valve seat surrounding said inlet opening, a reciprocably movable valve having a tapered face engageable with said tapered valve seat for shutting off communication between the inlet opening and discharge chamber, said tapered valve face having an annular groove therein, a reciprocably movable stem for said valve having a leak passage way therein communicating with the exterior, and ports leading from said groove in the valve face to said leak passage way for by-passing leakage liquid to said passage way and to the exterior and thereby prevent the same from entering the main discharge chamber of the valve.

6. A valve comprising an outer casing having an inlet opening, having a discharge chamber, and having a discharge opening, a valve seat surrounding said inlet opening, a reciprocably movable valve having a face engageable with said valve seat for shutting off communication between the inlet opening and discharge opening, said valve face having a groove therein, a reciprocably movable stem of sleeve form for said valve, an actuating stem slidable loosely within said sleeve to provide a leak passage way between the stem and sleeve, said valve having ports leading from the groove to the leak passage way for by-passing leakage liquid to said leak passage way, means movable in response to movement of said actuating stem for closing said by-pass, said actuating stem being further movable to open the valve, and yielding means for preventing movement of said valve until after the by-pass has been closed.

7. A valve comprising an outer casing having an inlet opening, having a discharge chamber, and having a discharge opening, a valve seat surrounding said inlet opening, a reciprocably movable valve having a face engageable with said valve seat for shutting off communication between the inlet opening and discharge opening, a reciprocably movable stem of sleeve form for said valve to provide a leak passageway in said sleeve, said valve having means leading from the face thereof to the leak passageway for by-passing leakage liquid to said leak passageway, and means confined within the sleeve and slidable therein for closing said by-pass prior to opening of said valve.

8. A valve comprising an outer casing having an inlet opening, having a discharge chamber, and having a discharge opening, a valve seat surrounding said inlet opening, a reciprocably movable valve having a face engageable with said valve seat for shutting off communication between the inlet opening and discharge opening, a reciprocably movable stem of sleeve form for said valve to provide a leak passageway in said sleeve, said valve having means leading from the face thereof to the leak passageway for by-passing leakage liquid to said leak passageway, and means confined within the sleeve and slidable therein for closing said by-pass prior to opening of said valve and for subsequently actuating said valve.

9. A valve comprising an outer casing having an inlet opening, having a discharge chamber, and having a discharge opening, a valve seat surrounding said inlet opening, a reciprocably movable valve having a face engageable with said valve seat for shutting off communication between the inlet opening and discharge opening, a reciprocably movable stem of sleeve form for said valve to provide a leak passageway in said sleeve, said valve having a port leading from the face thereof to the leak passageway for by-passing leakage liquid to said leak passageway, and a second valve slidable within the sleeve for closing the inner ends of said ports prior to opening of the first valve.

FERDINAND HINRICHS.